(12) United States Patent
Nakamura et al.

(10) Patent No.: US 9,802,472 B2
(45) Date of Patent: Oct. 31, 2017

(54) COOLING DEVICE AND WORK VEHICLE EQUIPPED WITH SAME

(71) Applicant: KOMATSU LTD., Tokyo (JP)

(72) Inventors: Eishi Nakamura, Hirakata (JP); Kouichi Kasahara, Hirakata (JP); Masahiro Suwano, Nara (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 15/035,795

(22) PCT Filed: Jan. 18, 2016

(86) PCT No.: PCT/JP2016/051270
§ 371 (c)(1),
(2) Date: May 11, 2016

(87) PCT Pub. No.: WO2016/104817
PCT Pub. Date: Jun. 30, 2016

(65) Prior Publication Data
US 2017/0203647 A1    Jul. 20, 2017

(51) Int. Cl.
*B60K 11/04* (2006.01)
*B60K 11/02* (2006.01)

(52) U.S. Cl.
CPC .................... *B60K 11/02* (2013.01)

(58) Field of Classification Search
CPC ......................................... B60K 11/00–11/06
See application file for complete search history.

(56) References Cited

U.S. PATENT DOCUMENTS

| | | | | |
|---|---|---|---|---|
| 7,128,178 B1* | 10/2006 | Heinle | ................ | B60K 11/04 165/41 |
| 2007/0144713 A1* | 6/2007 | Sugimoto | ............ | F28D 1/0452 165/140 |

FOREIGN PATENT DOCUMENTS

| | | |
|---|---|---|
| JP | 62-221919 A | 9/1987 |
| JP | 9-193673 A | 7/1997 |
| JP | 2005-324758 A | 11/2005 |
| JP | 2006-52689 A | 2/2006 |
| JP | 2007-22533 A | 2/2007 |
| JP | 2007163050 A | 6/2007 |
| WO | 2016/006718 A1 | 1/2016 |

OTHER PUBLICATIONS

The International Search Report for the corresponding international application No. PCT/JP2016/051270, dated Apr. 12, 2016.

* cited by examiner

*Primary Examiner* — Erez Gurari
(74) *Attorney, Agent, or Firm* — Global IP Counselors, LLP

(57) ABSTRACT

A cooling device includes a first radiator core, a second radiator core, a fan, a ventilation component, and a blocked part. The first radiator core and the second radiator core (42) are disposed adjacently with a specific space in between. The fan supplies air to the first radiator core and the second radiator core. The ventilation component is formed in part of the specific space and transmits air supplied from the fan. The blocked part is formed by a blocking member disposed in a different part of the specific space from the ventilation component.

9 Claims, 6 Drawing Sheets

COOLING DEVICE AND WORK VEHICLE EQUIPPED WITH SAME

CROSS-REFERENCE TO RELATED APPLICATIONS

This application is a U.S. National stage application of International Application No. PCT/JP2016/051270, filed on Jan. 18, 2016.

BACKGROUND

Field of the Invention

The present invention relates to a cooling device and to a work vehicle equipped with this cooling device.

Description of the Related Art

A conventional hydraulic excavator or other such work vehicle is provided with a cooling device for cooling the engine (see Japanese Laid-Open Patent Application 2007-163050, for example). With the cooling device in Japanese Laid-Open Patent Application 2007-163050, a configuration is disclosed in which a plurality of radiator cores are disposed adjacently to make maintenance easier.

With a cooling device configured in this way, the gap formed between adjacent radiator cores is blocked off with packing or the like, causing the air supplied by a fan to flow through the radiator cores as much as possible, and this improves the efficiency of heat exchange.

SUMMARY

With the above-mentioned conventional cooling device, however, there are situations when the temperature of a component in the engine compartment is raised by warm air that has undergone heat exchange as it passes through the radiator cores.

In view of the problems encountered with the above-mentioned conventional cooling device, it is an object of the present invention to provide a cooling device and a work vehicle with which the warming of a component by air that has been warmed by heat exchange can be suppressed.

The cooling device pertaining to a first exemplary embodiment of the present invention comprises a first radiator core, a second radiator core, a fan, a ventilation component, and a blocked part. The first radiator core and second radiator core are disposed adjacently with a specific space in between. The fan supplies air to the first radiator core and the second radiator core. The ventilation component is formed in part of the specific space and transmits air supplied from the fan. The blocked part is formed by a blocking member disposed in a different part of the specific space from the ventilation component.

Thus, the entire specific space between the first radiator core and the second radiator core is not closed off, and there remains a ventilation component through which air can pass. Accordingly, air that does not pass through the radiator cores is supplied through the ventilation component, and this minimizes temperature elevation in a component that this air hits.

Specifically, there are situations in which heat exchange occurs when air passes through the first radiator core and second radiator core, and the resulting warmed air raises the temperature of the component, but this temperature elevation of the component can be suppressed by forming a ventilation component so that air that has not passed through the radiator cores will hit the component.

The cooling device pertaining to a second exemplary embodiment of the present invention is the cooling device pertaining to the first exemplary embodiment of the present invention, wherein the ventilation component is formed at a location opposite a component molded from plastic.

Consequently, temperature elevation of the component molded from plastic can be suppressed. In general, plastic components can sometimes be deformed, etc., by high temperatures, so temperature elevation is undesirable. It is therefore preferable to apply to the present invention to components that are molded from plastic.

The cooling device pertaining to a third exemplary embodiment of the present invention is the cooling device pertaining to the first exemplary embodiment of the present invention, wherein the blocking member is disposed in a state of being in contact with the first radiator core and the second radiator core in a segment of the specific space running along the lengthwise direction.

Consequently, the blocked part can be formed in a segment of the specific space, and the air supplied by the fan can be prevented from passing through the specific space in this segment.

The cooling device pertaining to a fourth exemplary embodiment of the present invention is the cooling device pertaining to the first exemplary embodiment of the present invention, wherein the first radiator core and the second radiator core are disposed in a state of being adjacent in the horizontal direction. The ventilation component is formed above the center position in the up and down direction, which is the lengthwise direction of the specific space, and the blocked part is formed below the ventilation component.

Consequently, temperature elevation can be suppressed for component disposed at the top of the side of the first radiator core and second radiator core where air is discharged.

The cooling device pertaining to a fifth exemplary embodiment of the present invention is the cooling device pertaining to the second exemplary embodiment of the present invention, wherein the fan is disposed between the component and the first radiator core and between the component and the second radiator core.

Consequently, the fan can draw in outside air through the first radiator core and the second radiator core.

The cooling device pertaining to a sixth exemplary embodiment of the present invention is the cooling device pertaining to the second exemplary embodiment of the present invention, wherein the component is an engine air cleaner.

Consequently, air that has passed through the ventilation component can be directed at the air cleaner, which is an engine component disposed on the side of the first radiator core and second radiator core where the air is discharged and the temperature elevation of the air cleaner can be suppressed.

When the air cleaner is by itself, its temperature is the same as the atmospheric temperature, but when it is disposed on the side of the first radiator core and second radiator core where the air is discharged, its temperature will be raised by outside air whose temperature has been raised by heat exchange upon passing through the first radiator core and the second radiator core. However, when the ventilation component is formed at a position that is opposite the air cleaner, air (fresh air) that has passed through the ventilation component but not the radiator cores will come into the air cleaner, which keeps the temperature of the air cleaner from rising.

The work vehicle pertaining to a seventh exemplary embodiment of the present invention comprises a cooling device and a component. The cooling device has a first radiator core, a second radiator core, a fan, a ventilation component, and a blocked part. The first radiator core and second radiator core are disposed in a state of being adjacent with a specific space in between. The fan supplies air to the first radiator core and the second radiator core. The ventilation component is formed in part of the specific space and transmits air supplied from the fan. The blocked part is formed by a blocking member disposed in a different part of the specific space from the ventilation component. The component is disposed so as to be opposite the ventilation component, and is molded from plastic.

Consequently, air that has passed through the ventilation component can hit a component disposed on the side of the first radiator core and second radiator core where the air has been discharged, and temperature elevation of a component molded from plastic can be suppressed.

The exemplary embodiments of the present invention provide a cooling device and a work vehicle with which the warming of a component by air that has been warmed by heat exchange can be suppressed.

DETAILED DESCRIPTION OF EXEMPLARY EMBODIMENTS

The hydraulic excavator in an exemplary embodiment pertaining to the present invention will now be described through reference to the drawings.

1. Configuration 1-1. Overall Configuration of Hydraulic Excavator

Figure 1:
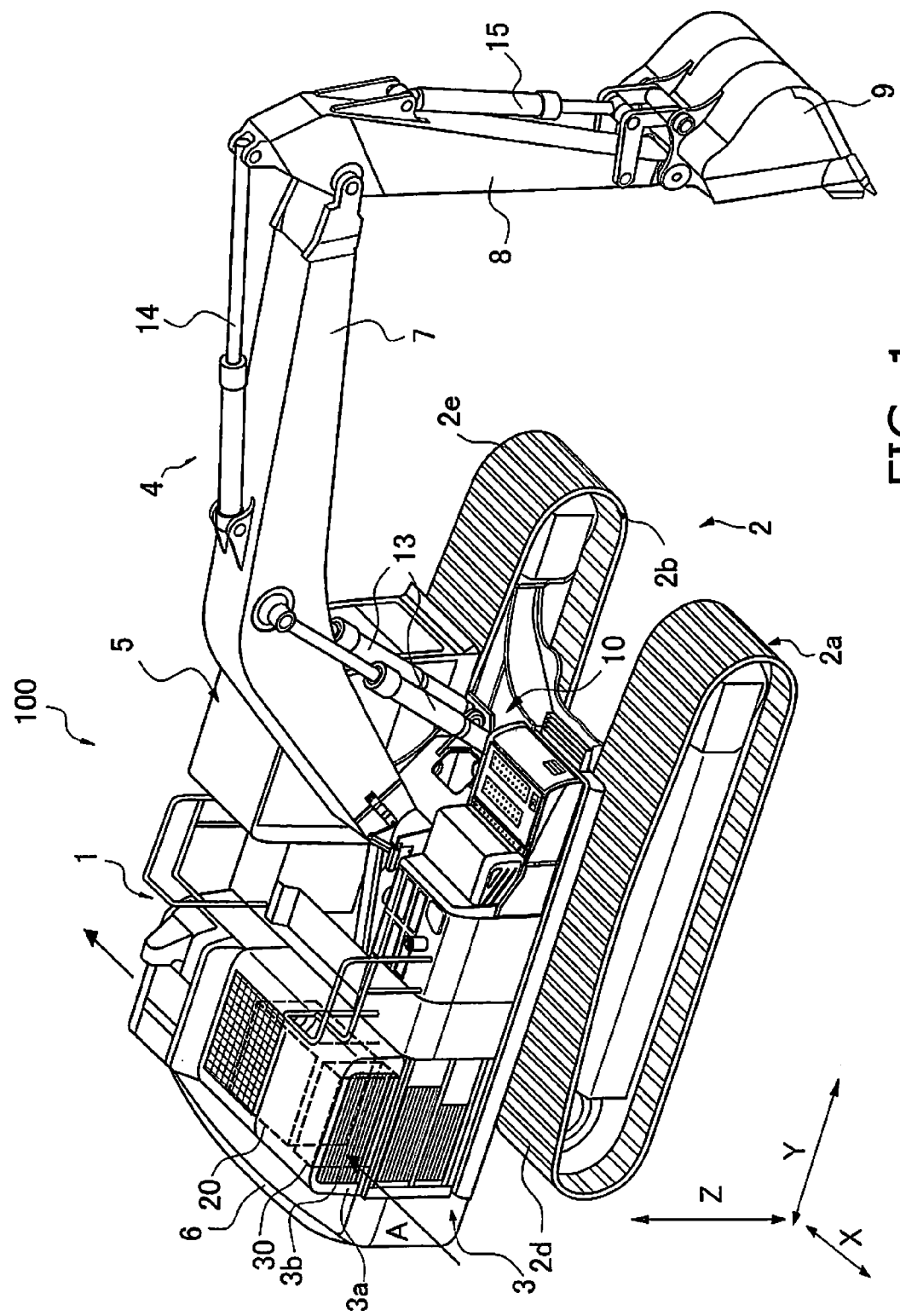
FIG. 1 is an oblique view of a hydraulic excavator pertaining to an exemplary embodiment of the present invention.

FIG. 1 shows a hydraulic excavator 100 pertaining to an exemplary embodiment of the present invention. This hydraulic excavator 100 comprises a vehicle body 1 and a work implement 4.

The vehicle body 1 has a traveling unit 2 and a revolving unit 3. The traveling unit 2 has a pair of traveling devices 2a and 2b. The traveling devices 2a and 2b have crawler belts 2d and 2e. The crawler belts 2d and 2e are driven by drive force from an engine, causing the hydraulic excavator 100 to travel.

The revolving unit 3 has a revolving frame 10 that is installed on the traveling unit 2, and is provided so as to be able to revolve with respect to the traveling unit 2. A cab 5 is provided as an operator's room on the upper side of the revolving frame 10, and on the front-left side of the revolving unit 3.

In this description of the overall configuration, the term "longitudinal direction" means the longitudinal direction of the cab 5. The longitudinal direction of the vehicle body 1 coincides with the longitudinal direction of the cab 5, that is, the longitudinal direction of the revolving unit 3. The "left and right direction" or the "side direction" means the vehicle width direction of the vehicle body 1. In the drawings, the longitudinal direction is indicated by an arrow Y, and the left and right direction by an arrow X. The vertical direction is indicated by an arrow Z.

The revolving unit 3 has an engine 20 disposed on the revolving frame 10, a cooling device 30 for cooling the engine 20, and so forth. A ventilation opening is formed on both side faces of the revolving unit 3 to the rear of the cab 5. FIG. 1 shows a ventilation opening 3b formed on the right side face 3a. Outside air that will be used for cooling in the cooling device 30 is drawn in through the ventilation opening 3b (see the arrow A). The drawn-in outside air is discharged to the outside from the ventilation opening formed on the left side face. A counterweight 6 is provided to the rear of the cooling device 30 and the engine 20 of the revolving unit 3.

The work implement 4 has a boom 7, an arm 8, and an excavation bucket 9, and is attached to a front center location on the revolving unit 3. The work implement 4 is disposed on the right side of the cab 5. The proximal end of the boom 7 is rotatably linked to the revolving unit 3. The distal end of the boom 7 is rotatably linked to the proximal end of the arm 8. The distal end of the arm 8 is rotatably linked to the excavation bucket 9.

A boom cylinder 13 is provided between the revolving frame 10 and the boom 7. An arm cylinder 14 is provided between the boom 7 and the arm 8. A bucket cylinder 15 is provided between the arm 8 and the excavation bucket 9. The boom cylinder 13, the arm cylinder 14, and the bucket cylinder 15 are all hydraulic cylinders. These hydraulic cylinders are driven to turn the boom 7, the arm 8, and the excavation bucket 9 and to drive the work implement 4. This results in excavation and other such work being carried out.

1-2. Cooling Device 30

Figure 2:
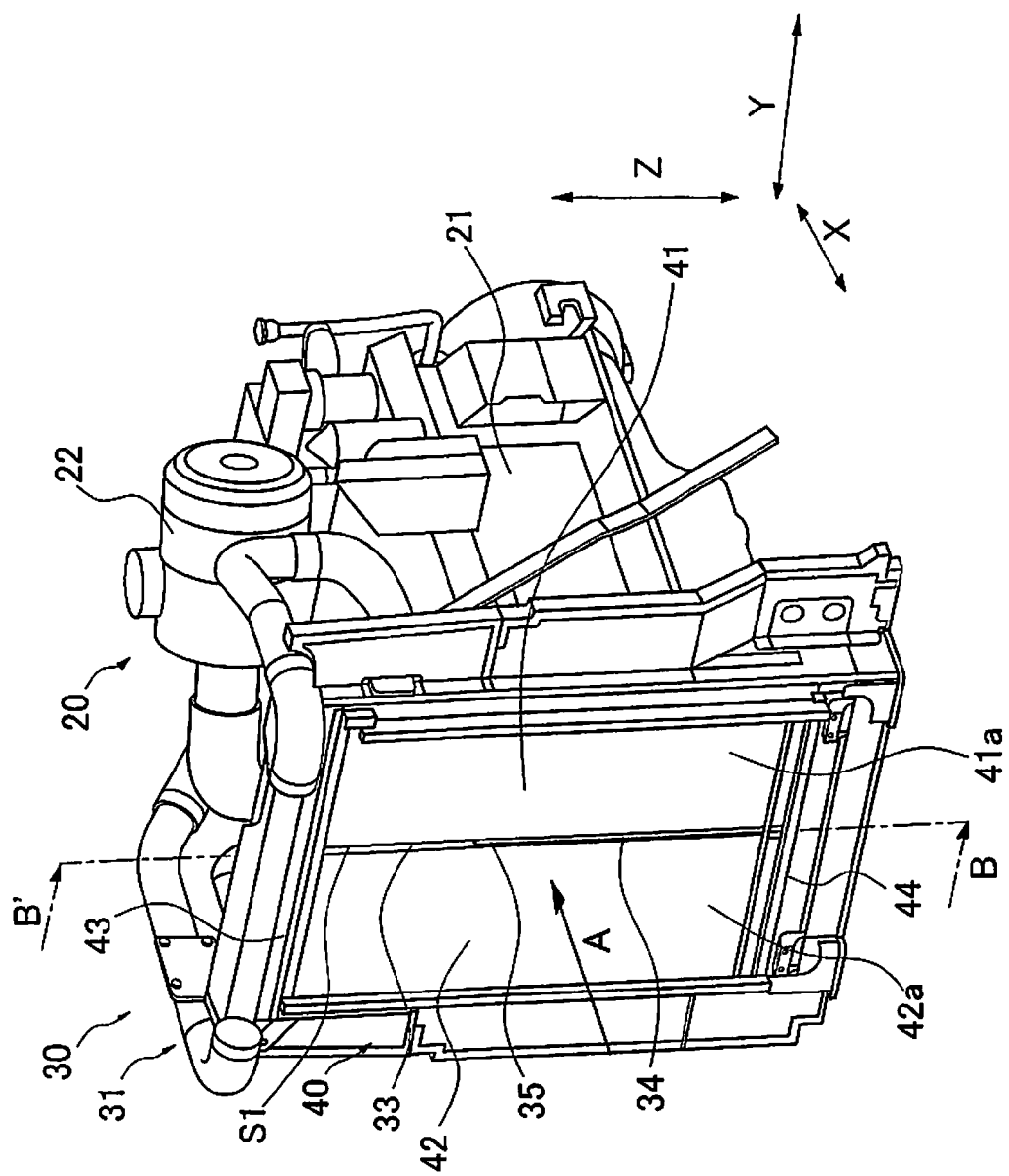
FIG. 2 is an oblique view of a cooling device and the engine of the hydraulic excavator in FIG. 1.
Figure 3:
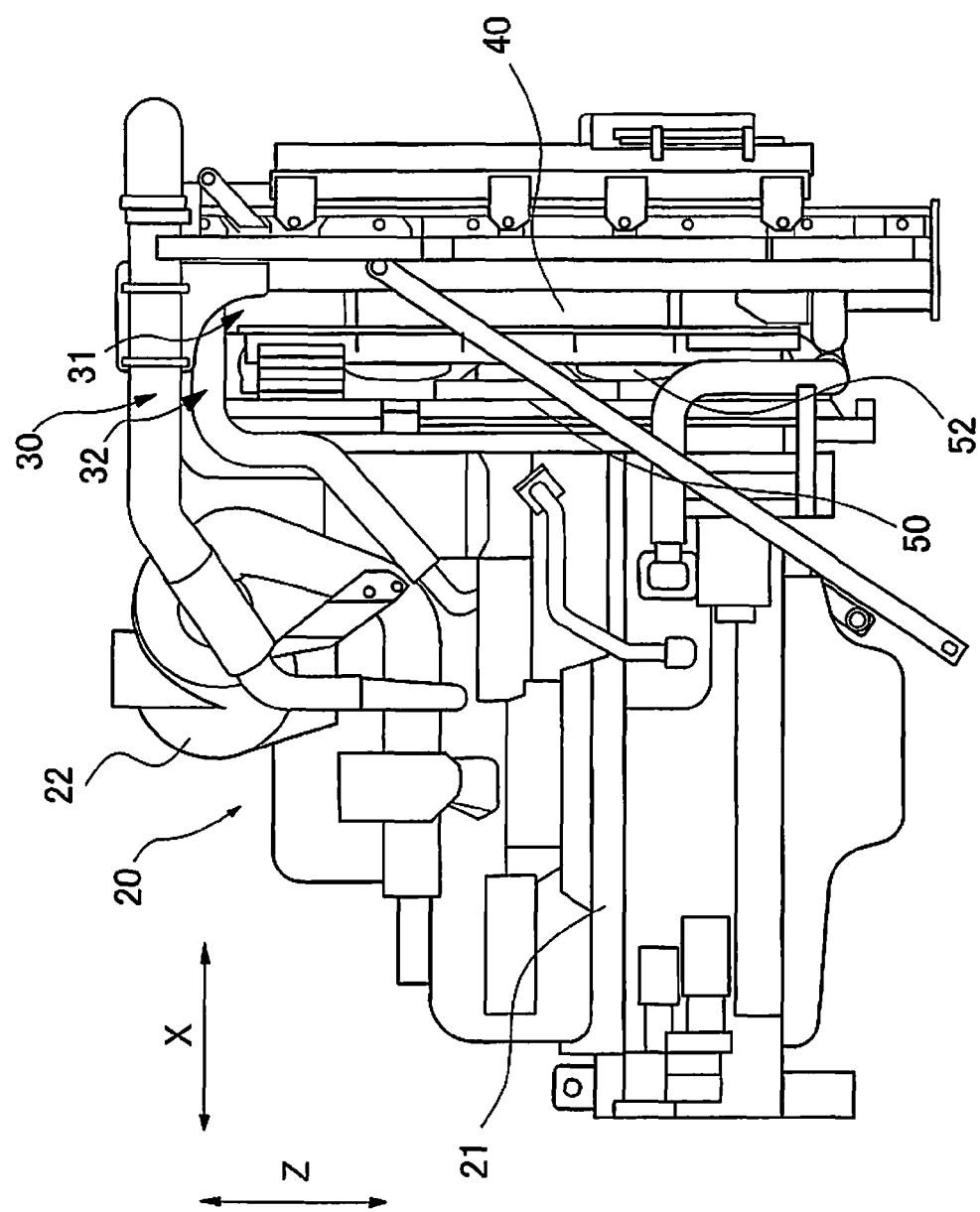
FIG. 3 is a side view of the engine and cooling device in FIG. 2 as seen from the rear of the vehicle.
Figure 4:
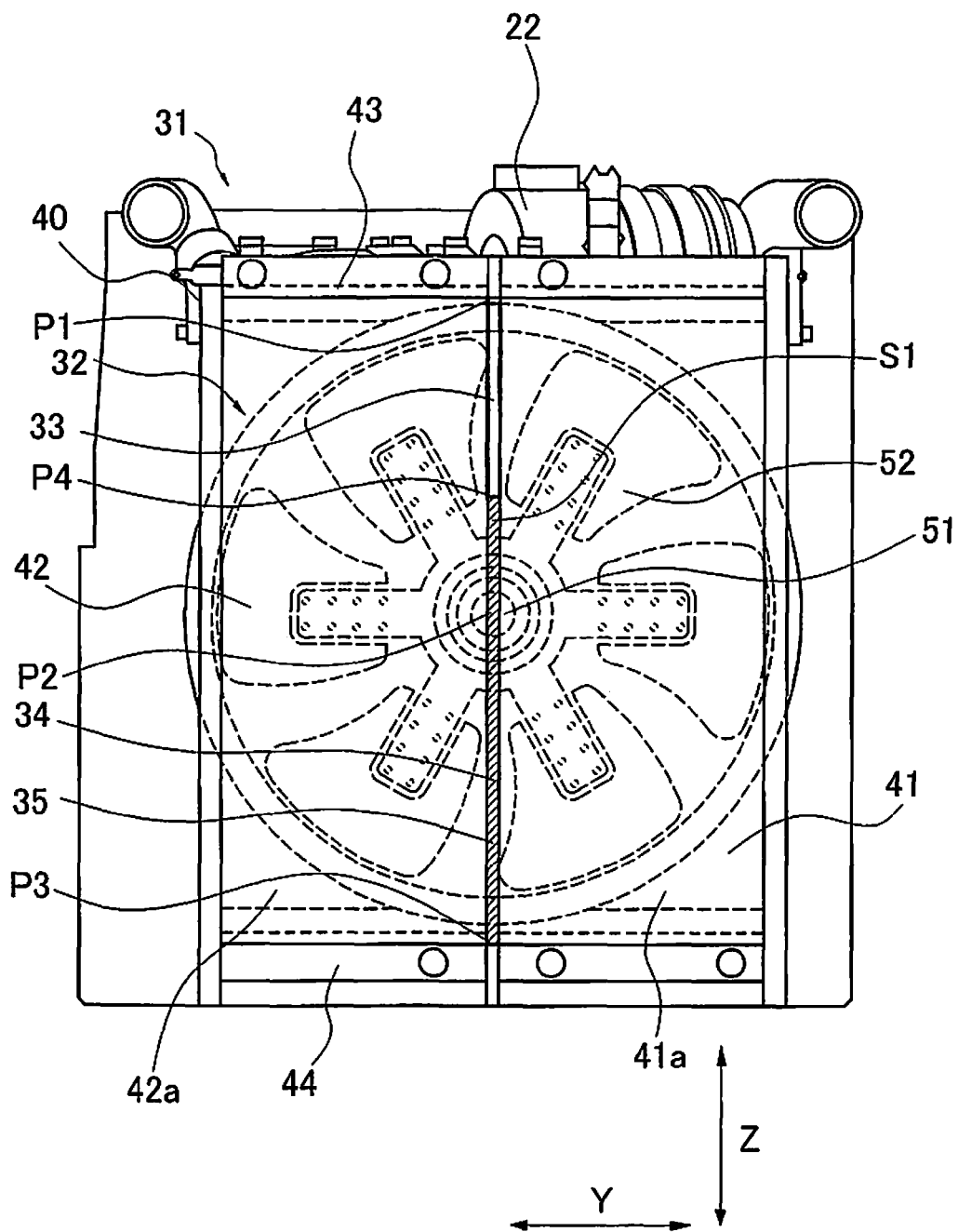
FIG. 4 is a front view of the cooling device in FIG. 2 as seen from the side of the vehicle.

FIG. 2 is an oblique view of the engine 20 and the cooling device 30 in this exemplary embodiment. FIG. 2 is an oblique view as seen from the right side face 3a side, just as in FIG. 1. FIG. 3 is a side view of the engine 20 and the cooling device 30 as seen from the rear of the vehicle body 1. FIG. 4 is a front view of the engine 20 and the cooling device 30 as seen from the right side face 3a side.

As shown in FIGS. 1 and 2, the engine 20 is disposed on the inside of the ventilation opening 3b, and the cooling device 30 is disposed between the ventilation opening 3b and the engine 20.

As shown in FIGS. 2 to 4, the cooling device 30 comprises a radiator 31, a fan 32, a ventilation component 33, and a blocked part 34.

1-3. Radiator 31

As shown in FIGS. 2 and 4, the radiator 31 has an outer frame 40, a first radiator core 41, and a second radiator core 42.

The outer frame 40 is substantially square as viewed along the arrow A direction, and is fixed on the inside of the revolving unit 3. The outer frame 40 has an upper tank 43 at the top and a lower tank 44 at the bottom.

The first radiator core 41 and the second radiator core 42 have a substantially flat outer shape, and are disposed adjacently, with a space S1 in between them, inside the outer frame 40. More precisely, the first radiator core 41 has a first incoming air face 41a on the side that receives incoming air, and a first air discharge face 41b on the side where the air is discharged (see FIG. 6; discussed below). The second radiator core 42 has a second incoming air face 42a on the side that receives incoming air, and a second air discharge face 42b on the side where the air is discharged (see FIG. 6; discussed below). The first radiator core 41 and the second radiator core 42 are disposed next to each other so that the first incoming air face 41a and the second incoming air face 42a are each facing the air that is drawn in by the fan 32, and the first incoming air face 41a and the second incoming air face 42a are disposed substantially in the same plane. The first air discharge face 41b and the second air discharge face 42b are also disposed in substantially the same plane.

As shown in FIG. 2, the first radiator core 41 and the second radiator core 42 are disposed next to each other in the longitudinal direction on the vehicle body 1, with the first radiator core 41 being disposed in front of the second radiator core 42.

As shown in FIG. 4, the space S1 is such that there is a narrow gap in the adjacent direction of the first radiator core 41 and the second radiator core 42 (see the arrow Y), and the direction (see the arrow Z) perpendicular to the adjacent direction (see the arrow Y) is the lengthwise direction. The lengthwise direction is the direction along the main faces of the first radiator core 41 and the second radiator core 42 (the first incoming air face 41a, the second incoming air face 42a, the first air discharge face 41b, and the second air discharge face 42b).

1-4. Fan 32

Figure 5:
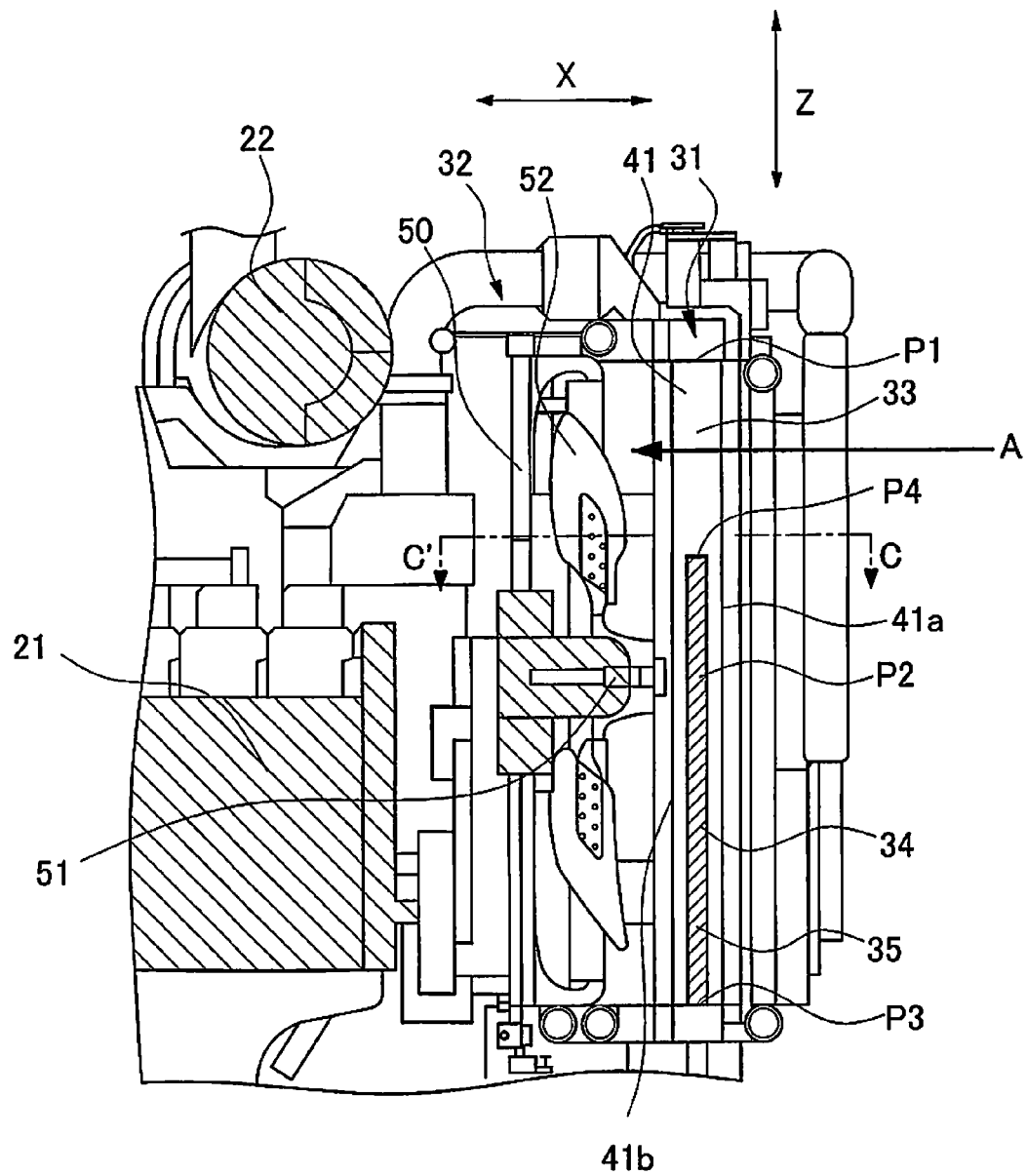
FIG. 5 is a cross section along the B-B' line in FIG. 2.

FIG. 5 is a cross section along the B-B' line in FIG. 2, and shows the area near the cooling device 30.

As shown in FIGS. 3 and 5, the fan 32 is disposed on the inside (could also be called the left side) of the radiator 31. As shown in FIG. 5, the fan 32 has a support frame 50, a shaft 51, and blades 52.

The support frame 50 is fixed on the inside of the revolving unit 3.

The shaft 51 is disposed on the support frame 50 rotatably along the air blowing direction (arrow A) so as to be perpendicular to the first incoming air face 41a and the second incoming air face 42a. The shaft 51 is disposed in the approximate center of the radiator 31, as shown in FIG. 4, when viewed along the arrow A direction.

The blades 52 are attached to the shaft 51, are rotated by the rotation of the shaft 51, and draw outside air into the revolving unit 3 through the ventilation opening 3b (see FIG. 1) and the radiator 31.

1-5. Ventilation Component 33 and Blocked Part 34

The blocked part 34 is where air drawn in by the fan 32 through the ventilation opening 3b is blocked. As shown in FIGS. 2 and 4, the blocked part 34 is formed by a blocking member 35 disposed in a state of being in contact with the first radiator core 41 and the second radiator core 42 in the space S1. The blocking member 35 is a sponge member, for example.

As shown in FIG. 4, the upper end position in the up and down direction of the space S1 shall be termed the first position P1, the center position shall be termed the second position P2, and the lower end position shall be termed the third position P3.

The blocking member 35 is disposed in the space S1 from a fourth position P4 between the first position P1 and the second position P2, to the third position P3. Thus, the blocked part 34 is formed by the blocking member 35 disposed from the third position P3 to the fourth position P4, and as shown in FIGS. 4 and 5, air drawn in from the outside through the ventilation opening 3b is blocked by the blocked part 34. The portion in FIGS. 4 and 5 where the blocking member 35 is disposed is indicated by hatching.

Figure 6:
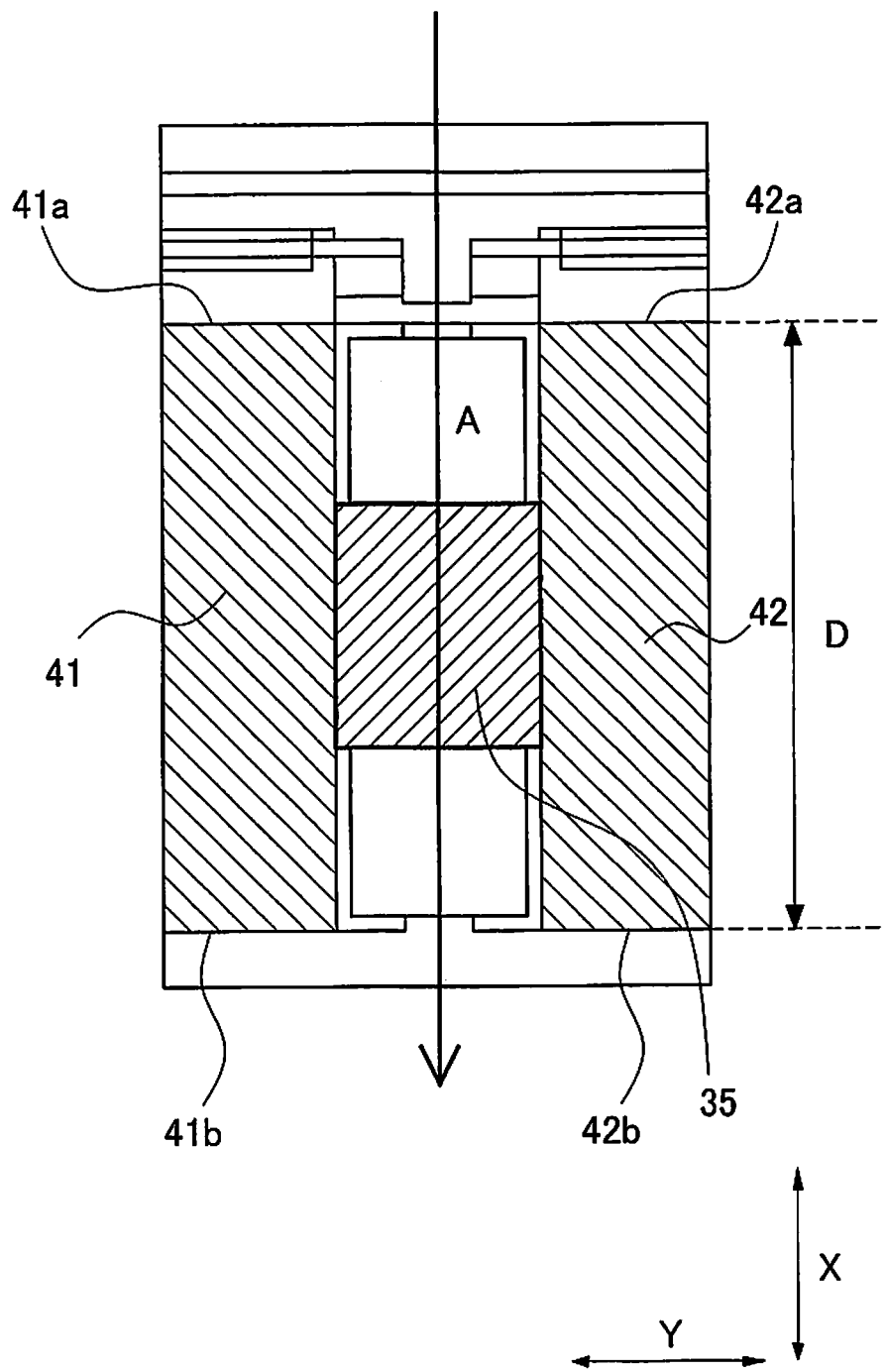
FIG. 6 is a cross section along the C-C' line in FIG. 5.

FIG. 6 is a cross section of the radiator 31 along the C-C' line in FIG. 5. As shown in FIG. 6, the blocking member 35 is disposed in the approximate center in the depth direction D of the first radiator core 41 and the second radiator core 42. As shown in FIG. 6, the blocking member 35 need not be disposed over the entire area in the depth direction of the first radiator core 41 and the second radiator core 42.

As shown in FIGS. 4 and 5, the blocking member 35 is not disposed between the first position P1 and the fourth position P4 in the space S1. That is, the space from the first position P1 to the fourth position P4 forms the ventilation component 33 through which air drawn in from the outside can pass. The ventilation component 33 could be said to communicate with the spaces on both sides of the radiator 31 (the space on the side where the air is supplied and the space on the side where the air is discharged).

1-6. Engine 20

As shown in FIG. 2, the engine 20 comprises an engine main body 21 and an air cleaner 22. The engine main body 21 comprises cylinders, a cylinder head, etc. The air cleaner 22 is molded from plastic, and removes dust and so forth from the air supplied to the engine main body 21.

In this exemplary embodiment, the engine 20 is disposed to the inside of the fan 32. That is, the radiator 31, the fan 32, and the engine 20 are disposed in that order starting from the right side face 3a along the left and right direction (the arrow X direction), and the engine 20 is disposed in the space on the side of the radiator 31 where the air is discharged.

The engine main body 21 is disposed on the lower side, and the air cleaner 22 is disposed on the upper side of the engine main body 21. As shown in FIG. 4, in its positional relation to the radiator 31 in the up and down direction, the engine main body 21 is disposed so as to be mainly opposite between the third position P3 and the fourth position P4 of the radiator 31 in the up and down direction. The air cleaner 22 is provided at a location opposite the ventilation component 33, and is disposed so that air that has passed through the ventilation component 33 hits it.

2. Operation 2-1. Intake Air Supplied by Fan

In this exemplary embodiment, the air drawn in through the ventilation opening 3b by the rotation of the fan 32 is blown against the first incoming air face 41a of the first radiator core 41 and the second incoming air face 42a of the second radiator core 42, and cools the engine coolant flowing through the first radiator core 41 and the second radiator core 42.

The intake air temperature is raised to between 80 and 90° C. by heat transfer from the coolant, and then is supplied through the fan 32 to the engine 20. The temperature of the engine main body 21 here is at least 100 degrees, so even this warmed intake air can cool the engine main body 21. Meanwhile, the air cleaner 22 is a device that supplies outside air to the engine main body 21, so it does not itself generate heat, and is molded from plastic. Therefore, it is not very desirable for the temperature of the air cleaner 22 to rise.

In this exemplary embodiment, the ventilation component 33 is formed between the first radiator core 41 and the second radiator core 42, and the intake air that has passed through the ventilation component 33 is blown against the air cleaner 22. That is, the intake air that has passed through the ventilation component 33 does not pass through the first radiator core 41 and the second radiator core 42, so there is less temperature elevation caused by the radiator 31 as compared to air that has passed through the first radiator core 41 and the second radiator core 42. The air that goes through the ventilation component 33 and is sent to the side of the radiator 31 on which the air is discharged is then blown against the air cleaner 22 disposed opposite the ventilation component 33.

Since air whose temperature has not been so much elevated is thus blown against the air cleaner 22, it is less likely that the temperature of the air cleaner 22 will be raised by air that has passed through the first radiator core 41 and the second radiator core 42.

3. Features, Etc.

3-1

As shown in FIGS. 3 and 4, the cooling device 30 in this exemplary embodiment comprises the first radiator core 41, the second radiator core 42, the fan 32, the ventilation component 33, and the blocked part 34. The first radiator core 41 and the second radiator core 42 are disposed in a state of being adjacent with the space S1 (an example of a specific space) between them. The fan 32 supplies air to the first radiator core 41 and the second radiator core 42. The ventilation component 33 is formed in part of the space S1, and transmits the air supplied from the fan 32. The blocked part 34 is formed by the blocking member 35 disposed in a different part of the space S1 from the ventilation component 33.

Thus, the space S1 between the first radiator core 41 and the second radiator core 42 is not entirely blocked off by the blocking member 35, leaving the ventilation component 33 through which air can pass. Accordingly, air that has passed through the ventilation component 33, but not the first radiator core 41 and the second radiator core 42, is supplied to the space on the side of the first radiator core 41 and the second radiator core 42 on which air is discharged, and it is less likely that the temperature of a component hit by this air will be raised.

Specifically, there are situations when the temperature of the component is raised by air that has been warmed by heat exchange upon passing through the first radiator core 41 and the second radiator core 42. However, the temperature elevation of such component can be reduced by forming the ventilation component 33 so that air that does not pass through the first radiator core 41 and the second radiator core 42 hits these parts.

3-2

With the cooling device 30 in this exemplary embodiment, the ventilation component 33 is formed at a location opposite the air cleaner 22 molded from plastic (an example of a component).

This makes it less likely that the temperature of the plastic-molded air cleaner 22 will be raised. In general, plastic components are prone to deformation and so on at higher temperatures, so it is preferable to minimize temperature elevation.

Specifically, air that has passed through the ventilation component 33 is able to hit the air cleaner 22, which is a component of the engine 20 disposed on the side of the first radiator core 41 and the second radiator core 42 on which the air is discharged, and this reduces the elevation of temperature in the air cleaner 22.

The temperature of the air cleaner 22 is the same as the temperature of the outside air, but when the air cleaner 22 is disposed to the inside of the first radiator core 41 and the second radiator core 42 (an example of the side on which the air is discharged), its temperature rises. This is due to outside air that has been warmed by heat exchange upon passing through the first radiator core 41 and the second radiator core 42. However, since the ventilation component 33 is formed at a location opposite the air cleaner, air (outside air) that has passed through the ventilation component 33 without going through the first radiator core 41 and the second radiator core 42 will be blown against the air cleaner 22, and this makes it less likely that the temperature of the air cleaner 22 will rise.

3-3

With the cooling device 30 in this exemplary embodiment, the blocking member 35 is disposed in a state of being in contact with the first radiator core 41 and the second radiator core 42 in a section of the space S1 from the third position P3 to the fourth position P4 (an example of a section) running in the lengthwise direction (the arrow Z direction).

Consequently, the blocked part 34 can be formed in a section of the space S1, and the air supplied by the fan 32 in this section can be prevented from passing through the space S1.

3-4

With the cooling device 30 in this exemplary embodiment, the first radiator core 41 and the second radiator core 42 are disposed in a state of being adjacent in the horizontal direction. The ventilation component 33 is formed higher than a second position (an example of a center position) in the up and down direction, which is the lengthwise direction of the space S1. The blocked part 34 is formed on the lower side of the ventilation component 33.

Consequently, temperature elevation can be suppressed in a component disposed at the top of the space on the side of the first radiator core 41 and the second radiator core 42 on which the air is discharged.

3-5

With the cooling device 30 in this exemplary embodiment, the fan 32 is disposed between the air cleaner 22 (an example of a component) and the first radiator core 41 and between the air cleaner 22 and the second radiator core 42.

Consequently, outside air can be drawn in by the fan 32 through the first radiator core 41 and the second radiator core 42.

3-6

The hydraulic excavator 100 (an example of a work vehicle) in this exemplary embodiment comprises the cooling device 30 and the air cleaner 22 (an example of a component).

As shown in FIGS. 3 and 4, the cooling device 30 comprises the first radiator core 41, the second radiator core 42, the fan 32, the ventilation component 33, and the blocked part 34. The first radiator core 41 and the second radiator core 42 are disposed in a state of being adjacent with the space S1 in between. The fan 32 supplies air to the first radiator core 41 and the second radiator core 42. The ventilation component 33 is formed in part of the space S1, and transmits air supplied from the fan 32. The blocked part 34 is formed by the blocking member 35 disposed in a different part of the space S1 from the ventilation component 33. The air cleaner 22 is formed from plastic and is disposed opposite the ventilation component 33.

Consequently, air that has passed through the ventilation component 33 can hit the air cleaner 22, which is a component of the engine 20 disposed on the side of the first radiator core 41 and the second radiator core 42 on which the air is discharged, and temperature elevation of the air cleaner 22 can be suppressed.

4. Other Exemplary Embodiments

An exemplary embodiment of the present invention is described above, but the present invention is not limited to or by the above exemplary embodiment, and various modifications are possible without departing from the gist of the invention.

With the cooling device 30 in the above exemplary embodiment, the radiator 31 and the fan 32 are disposed in that order starting from the ventilation opening 3b of the right side face 3a, but this is not the only option, and the order of the radiator 31 and the fan 32 may be reversed. Specifically, the fan 32 and the radiator 31 may be disposed in that order starting from the ventilation opening 3b.

With the cooling device 30 in the above exemplary embodiment, the radiator 31 and the fan 32 are disposed opposite each other, but this is not the only option, and air drawn in by the fan 32 may be supplied by a duct or the like to the radiator 31. In short, air should be supplied by the fan 32 to the radiator 31.

With the cooling device 30 in the above exemplary embodiment, the ventilation component 33 is formed from the first position P1 which is located at the upper end of the space S1 to the fourth position P4, but this is not the only option. For instance, when the air cleaner 22 is disposed near the center of the radiator 31 (when viewed in the arrow A direction), the ventilation component 33 may be formed near the center in the up and down direction. Also, in this case, the blocked part 34 may be formed on both the upper and lower sides of the ventilation component 33.

In short, the ventilation component 33 should be formed so as to be able to supply air that has not passed through the first radiator core 41 and the second radiator core 42 to the component whose temperature elevation is to be suppressed.

With the cooling device 30 in the above exemplary embodiment, the ventilation component 33 is provided in only one section from the first position P1 to the fourth position P4 in the space S1, but may instead be provided to a plurality of sections.

The space S1 of the cooling device 30 in the above exemplary embodiment is formed so that its lengthwise direction runs vertically (the arrow Z), but is not limited to the vertical direction, and its lengthwise direction may instead run horizontally. Specifically, the first radiator core 41 and the second radiator core 42 need not be disposed in a state of being adjacent in the horizontal direction, and may instead be disposed in a state of being adjacent in the up and down direction, for example.

With the cooling device 30 in the above exemplary embodiment, two radiator cores are provided, but three or more may be provided instead.

With the cooling device 30 in the above exemplary embodiment, a sponge is given as an example of a blocking member, but this is not limited to a sponge, and can be any material capable of blocking air.

With the cooling device 30 in the above exemplary embodiment, an example is given in which the air cleaner 22 of the engine 20 is the component whose temperature is to be kept low, but this need not be the air cleaner 22. Furthermore, it need not be a component that is related to the engine 20.

In the above exemplary embodiment, a hydraulic excavator is described as an example of a work vehicle, but this is not limited to a hydraulic excavator, and may instead be a bulldozer, a wheel loader, or the like.

The cooling device of the exemplary embodiments of the present invention has the effect of being able to suppress temperature elevation in a component caused by air that has been warmed by heat exchange, and can be applied to work vehicles and so forth.

The invention claimed is:

1. A cooling device, comprising:
   a first radiator core disposed adjacent a second radiator core, the first radiator core and the second radiator core being spaced apart with a specific space in between;
   a fan that supplies air to the first radiator core and the second radiator core;
   a ventilation component formed in part of the specific space and through which air supplied from the fan passes; and
   a blocked part formed by a blocking member disposed in a different part of the specific space from the ventilation component, the blocking member spanning an entire width of the specific space in a direction in which the first radiator core and the second radiator core are spaced apart,
   the first radiator core having a first incoming air face for receiving the air supplied from the fan, and the second radiator having a second incoming air face for receiving the air supplied from the fan, the first incoming air face and the second incoming air face being arranged to extend in the direction in which the first radiator core and the second radiator core are spaced apart.

2. The cooling device according to claim 1, wherein the ventilation component is arranged to at least partially overlap with a component molded from plastic when the ventilation component is viewed along a direction in which the air passes through the ventilation component.

3. The cooling device according to claim 2, wherein the fan is disposed between the component and the first radiator core and between the component and the second radiator core.

4. The cooling device according to claim 2, wherein the component is an engine air cleaner.

5. The cooling device according to claim 1, wherein the first incoming air face and the second incoming air face are arranged in the same plane.

6. The cooling device according to claim 1, wherein the first incoming air face and the second incoming air face are arranged perpendicular to an air blowing direction of the air supplied from the fan.

7. A cooling device, comprising:
   a first radiator core disposed adjacent a second radiator core, the first radiator core and the second radiator core being spaced apart with a specific space in between;
   a fan that supplies air to the first radiator core and the second radiator core;
   a ventilation component formed in part of the specific space and through which air supplied from the fan passes; and
   a blocked part formed by a blocking member disposed in a different part of the specific space from the ventilation component, the blocking member spanning an entire width of the specific space in a direction in which the first radiator core and the second radiator core are spaced apart,
   the blocking member contacts the first radiator core and the second radiator core.

8. A cooling device, comprising:
   a first radiator core disposed adjacent a second radiator core with a specific space in between;
   a fan that supplies air to the first radiator core and the second radiator core;

a ventilation component formed in part of the specific space and through which air supplied from the fan passes; and a blocked part formed by a blocking member disposed in a different part of the specific space from the ventilation component, the first radiator core and the second radiator core being disposed adjacent one another in a horizontal direction, the ventilation component being formed above a center position in the up and down direction, and the blocked part is formed below the ventilation component.

9. A work vehicle, comprising:

a cooling device having
  a first radiator core disposed adjacent a second radiator core, the first radiator core and the second radiator core being spaced apart with a specific space in between,
  a fan that supplies air to the first radiator core and the second radiator core,
  a ventilation component formed in part of the specific space and through which air supplied from the fan passes, and
  a blocked part formed by a blocking member disposed in a different part of the specific space from the ventilation component, the blocking member spanning an entire width of the specific space in a direction in which the first radiator core and the second radiator core are spaced apart,
  the first radiator core having a first incoming air face for receiving the air supplied from the fan, and the second radiator having a second incoming air face for receiving the air supplied from the fan, the first incoming air face and the second incoming air face being arranged to extend in the direction in which the first radiator core and the second radiator core are spaced apart; and a component arranged and configured to at least partially overlap with the ventilation component when viewed along a direction in which the air passes through the ventilation component, the component being molded from plastic.

* * * * *